(12) United States Patent
Herden

(10) Patent No.: US 11,052,884 B2
(45) Date of Patent: Jul. 6, 2021

(54) BRAKING CONTROL FOR RAIL VEHICLES WITH ADAPTIVE LINING CHARACTERISTIC CURVE

(71) Applicant: KNORR-BREMSE SYSTEME FÜR SCHIENENFAHRZEUGE GMBH, Munich (DE)

(72) Inventor: Marc-Oliver Herden, Munich (DE)

(73) Assignee: KNORR-BREMSE SYSTEME FÜR SCHIENENFAHRZEUGE GMBH, Munich (DE)

( * ) Notice: Subject to any disclaimer, the term of this patent is extended or adjusted under 35 U.S.C. 154(b) by 219 days.

(21) Appl. No.: 16/064,939

(22) PCT Filed: Dec. 13, 2016

(86) PCT No.: PCT/EP2016/080841
§ 371 (c)(1),
(2) Date: Jun. 21, 2018

(87) PCT Pub. No.: WO2017/108505
PCT Pub. Date: Jun. 29, 2017

(65) Prior Publication Data
US 2018/0370505 A1  Dec. 27, 2018

(30) Foreign Application Priority Data
Dec. 21, 2015 (DE) .................. 10 2015 226 344.4

(51) Int. Cl.
*B60T 8/17* (2006.01)
*B60T 8/171* (2006.01)
(Continued)

(52) U.S. Cl.
CPC ............ *B60T 8/1705* (2013.01); *B60T 8/171* (2013.01); *B61H 13/34* (2013.01); *B60T 8/1818* (2013.01); *B60T 8/56* (2013.01); *B60T 2270/14* (2013.01)

(58) Field of Classification Search
CPC ...... B60T 8/1705; B60T 8/1893; B60T 8/171; B60T 8/1818; B60T 8/56; B60T 2270/14; B61H 13/34
See application file for complete search history.

(56) References Cited

U.S. PATENT DOCUMENTS 3,948,571 A * 4/1976 Hefter .................. B60T 8/1893
303/22.7
5,004,299 A * 4/1991 Brearley .................. B60T 8/00
303/15
(Continued)

FOREIGN PATENT DOCUMENTS

CN  1424211 A  6/2003
CN  1791524 A  6/2006
(Continued)

OTHER PUBLICATIONS

Search Report and Written Opinion for International Patent Application No. PCT/EP2016/080841 dated Mar. 7, 2017.
(Continued)

*Primary Examiner* — Anshul Sood
(74) *Attorney, Agent, or Firm* — Barnes & Thornburg LLP

(57) ABSTRACT

The invention relates to a device and a method for controlling a braking device of a rail vehicle, wherein a pressure characteristic curve of the braking device is changed by means of characteristic curve change device as a function of a frictional characteristic of a type of brake lining used in the braking device.

12 Claims, 2 Drawing Sheets

(51) Int. Cl.
*B61H 13/34* (2006.01)
*B60T 8/56* (2006.01)
*B60T 8/18* (2006.01)

(56) References Cited

U.S. PATENT DOCUMENTS

| | | | |
|---|---|---|---|
| 7,905,556 B2 * | 3/2011 | Huber | B60T 13/261 |
| | | | 188/170 |
| 9,586,569 B2 * | 3/2017 | Drewes | B60T 7/12 |
| 2009/0152054 A1 * | 6/2009 | Baumgartner | F16D 65/183 |
| | | | 188/34 |
| 2010/0131166 A1 | 5/2010 | Fuchs et al. | |
| 2011/0029213 A1 * | 2/2011 | Itano | B60T 17/228 |
| | | | 701/70 |
| 2013/0338860 A1 * | 12/2013 | Herden | B61H 9/00 |
| | | | 701/20 |

FOREIGN PATENT DOCUMENTS

| | | | |
|---|---|---|---|
| CN | 102256847 A | 11/2011 | |
| CN | 102834638 A | 12/2012 | |
| DE | 2015799 A1 | 10/1971 | |
| DE | 102009004528 A1 | 10/2009 | |
| WO | 2009129085 A2 | 10/2009 | |
| WO | 2010069520 A2 | 6/2010 | |
| WO | 2013132480 A1 | 9/2013 | |

OTHER PUBLICATIONS

Chinese Office Action corresponding to CN 201680080279.6, dated Apr. 24, 2020.

\* cited by examiner

BRAKING CONTROL FOR RAIL VEHICLES WITH ADAPTIVE LINING CHARACTERISTIC CURVE

PRIORITY AND CROSS REFERENCE

This patent application is a U.S. National Phase of International Patent Application No. PCT/EP2016/080841, filed Dec. 13, 2015, which claims priority to German Patent Application No. 10 2015 226 344.4, filed Dec. 21, 2015, the disclosure of which being incorporated herein by reference in their entireties.

FIELD

Disclosed embodiments relate to an apparatus and a method for controlling a brake device for rail vehicles.

BACKGROUND

In modern rail vehicles, use is frequently made of pneumatic or hydraulic brake devices which are controlled by electronic brake control devices. During the vehicle certification process, the pneumatically or mechanically operating control and limiting valves for the load pressure are adapted to the characteristics of the brake pad. Here, in general, use is made of a friction coefficient ($\mu$), averaged over time, between the brake friction surfaces (for example brake pad and brake disk), which friction coefficient is characteristic for a brake pad type. The pressure control is then set such that—additionally with compensation by means of the load pressure—the desired brake cylinder pressure is realized in the rapid brake.

WO 2010/069520 A2 has disclosed a brake system of a rail vehicle with compensation of small fluctuations of the friction conditions, in the case of which the outlay in terms of production and maintenance of the brake system is reduced by virtue of the profile with respect to time of at least one variable which represents fluctuations of the friction conditions between wheel and rail and/or between brake pad and brake disk, such as wheel rotational speed, wheel circumferential acceleration, braking force, braking torque or brake pressure, being measured by means of a sensor device and the braking force generated by the brake actuator being adapted in a manner dependent on a deviation of the profile with respect to time of the measured variable from a predefined or expected profile with respect to time of the variable.

SUMMARY

Disclosed embodiments provide an apparatus and a method for controlling a brake device for rail vehicles, with which, with reduced technical outlay, multiple brake pad types with different friction characteristics can be utilized during operation.

BRIEF DESCRIPTION OF THE FIGURES

Disclosed embodiments are discussed in more detail below on the basis of exemplary embodiments and with reference to the appended figures of the drawing, in which.

DETAILED DESCRIPTION

Figure 1:
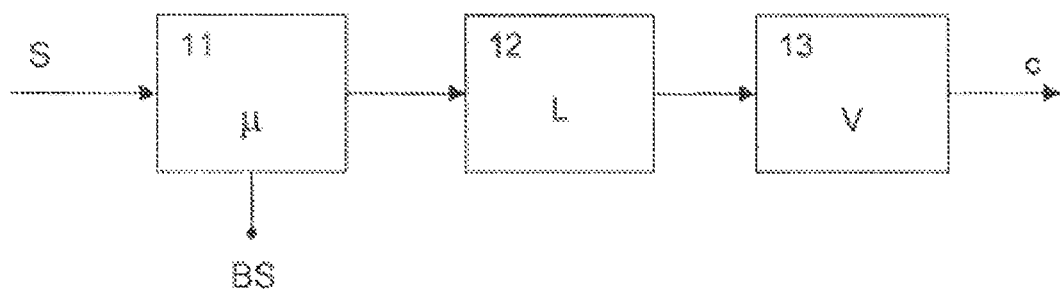
FIG. 1 shows a schematic functional block diagram of a brake control apparatus according to a first exemplary embodiment.

In general, a rail vehicle is certified together with a specific brake pad type, which then ultimately also determines the abovementioned predefined profile with respect to time of the variable which represents the friction condition fluctuations. This restricts the operator with regard to the selection of possible brake pad types, and leads to increased technical outlay in the event of a planned change of the brake pad type.

Disclosed embodiments, therefore, provide an apparatus and a method for controlling a brake device for rail vehicles, with which, with reduced technical outlay, multiple brake pad types with different friction characteristics can be utilized during operation.

In accordance with the disclosed embodiments, the pressure characteristic curve of the brake device (for example of the brake actuator) is varied in a manner dependent on the pressure characteristic curve of the brake device (for example of the brake actuator). It is, thus, possible, for example, for at least two different characteristic curves to be made available, between which an automatic switchover can be performed in a manner dependent on the installed pad type, for example during the course of maintenance activity or with automatic detection. The variation may for example be a vertical shift of the pressure-speed characteristic curve along the pressure axis. Independently of the load correction, the pressure characteristic curve, for example in the case of a rapid braking operation, may be shifted such that the different average friction coefficient ($\mu$) of the presently used brake pad type is incorporated and thus compensated. Cumbersome conversion or reprogramming of the brake controller after a change of the brake pad type can, thus, be omitted.

In a first advantageous implementation, a determining device may be provided for determining the friction characteristic on the basis of a control signal that indicates the selected brake pad type. This offers the possibility of simple control by means of manual or automatic switchover between different control signal values, which each correspond to a brake pad type. In detail, the control signal may be generated for example in response to a manual, electrical, electronic or electropneumatic switchover connected to the use of a new brake pad type.

In a second advantageous implementation, the control signal for the variation of the pressure characteristic curve may be generated both in the case of a rapid braking operation and in the case of a normal service braking operation, such that the service brake can also be influenced in the event of a change of the brake disk type.

In a third advantageous implementation, the characteristic curve changing device may be designed such that the vertical shift of the pressure-speed characteristic curve is obtained in a pressure transmitter by aerating an additional pilot-control volume or by generating an additional piston area by connecting two control chambers. The aeration of the additional pilot-control volume or the generation of the additional piston area can be performed in this case for example by actuating a solenoid valve, in particular an impulse valve. This permits a characteristic curve shift that can be realized in a technically simple manner.

In a fourth advantageous implementation, the characteristic curve changing device may be designed such that the vertical shift of the pressure-speed characteristic curve is obtained in a pressure transmitter by pressure variation in a second control chamber. Here, the characteristic curve changing device may for example be designed such that the pressure variation is performed in multi-stage fashion.

In the context of this description, the characteristic curve changing device and the determining device may be implemented using software components and/or hardware components. They may have one or more interfaces for being able to exchange suitable data with other devices of the rail vehicle, and/or may be implemented as one or more modules and/or processes and/or objects and/or threads.

A description of advantageous exemplary embodiments will be given below on the basis of an exemplary brake device for a rail vehicle for providing a friction-coefficient-compensated brake control pressure for a pneumatic brake device of the rail vehicle.

FIG. 1 shows a schematic functional block diagram of a brake control apparatus according to a first exemplary embodiment. According to the first exemplary embodiment, a load pressure control, limiting or relay valve is designed such that, independently of the load correction (L) of the brake pressure c by means of a corresponding load correction unit (L) 12, an additional variation (for example shift) of the pressure characteristic curve, for example in the event of a rapid braking operation, is possible by means of an increase in volume by means of a boost unit (V) 13 for the purposes of compensating a change in friction coefficient as a result of a change of the brake pad type. For this purpose, a friction coefficient determination or friction coefficient adaptation unit 11 is firstly necessary, which compensates or incorporates a preset setpoint value S in a manner dependent on an average friction coefficient which is dependent on the brake pad type used.

This may also involve simple switchover between different pad-type-dependent setpoint values. For this purpose, for example, a control signal BS which indicates the brake pad type is determined in response to a manual or automatic determination of the brake pad type. Since typically always only one pad type is installed for a brake controller in the rail vehicle, it may be sufficient for the pressure characteristic curves to be configured to be switchable. The characteristic curve switchover by means of a change in boosting in the boost unit 13 in response to the control signal BS may be performed for example manually, electrically, electronically or electropneumatically. In FIG. 1, the sequence of the load correction unit 12 and of the boost unit 13 may also be interchanged.

The load correction unit 12 may for example be designed so as to receive a pneumatic load pressure signal which indicates a load value of the rail vehicle or of an associated axle of the rail vehicle. Said signal may for example originate from an air bellows. The brake pressure is then varied, for load correction purposes, on the basis of the load pressure signal.

Provision may optionally also be made for the characteristic curve selected in response to the control signal BS to also be used for influencing the normal service brake, in order to thereby also introduce friction coefficient compensation for normal braking operation. For this purpose, the selected brake pad type, the value of the control signal BS or a switching position for the characteristic curve selection may also be read into the brake or drive controller of the service brake and taken into consideration for the purposes of the control.

Figure 2:
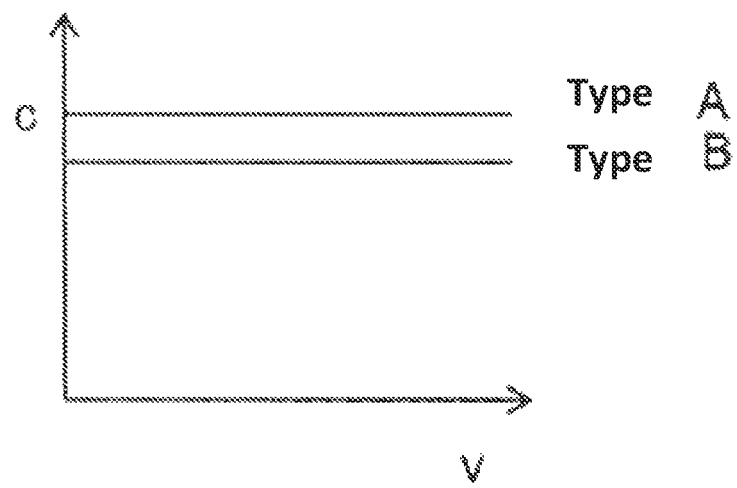
FIG. 2 shows a diagram with two different selectable pressure-speed characteristic curves according to the first exemplary embodiment.

FIG. 2 shows a diagram (brake pressure (C) versus speed (v)) with two brake pressure characteristic curves for a first brake pad type A and a second brake pad type B. As can be seen from FIG. 2, the pressure characteristic curves differ by a vertical shift in the direction of the axis of the brake pressure (also referred to as "c pressure"). The first pad type A thus requires a higher brake pressure than the second pad type B. For the compensation of the changed friction coefficient in the event of a change from the pad type B to the pad type A, it is thus necessary for the pressure characteristic curve to be shifted upward in a vertical direction in order that a higher brake pressure is built up during operation. A change of the brake pad type from A to B requires a vertical shift of the characteristic curve downward, and thus a lower brake pressure.

Such a characteristic curve shift or variation in the boost unit 13 may be realized for example by means of a pressure transmitter (EDU). This may be realized for example such that a second pressure chamber is filled with a pilot-control pressure, such that the c pressure then abruptly increases.

Figure 3:
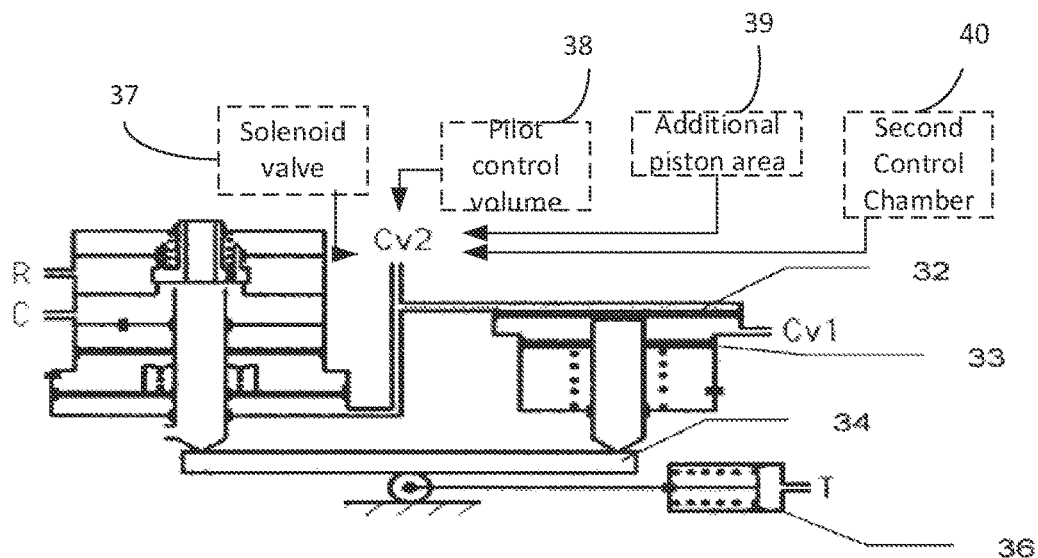
FIG. 3 shows a sectional view of a pressure transmitter for realizing the characteristic curve switchover according to a second to fifth exemplary embodiment.

FIG. 3 shows a schematic sectional view of a pressure transmitter for use in a second to fifth exemplary embodiment. As discussed in the introduction with reference to FIG. 1, it is the intention for the pressure characteristic curve and thus the brake pressure C to be switched over to the higher or low stage (pressure characteristic curve) in a manner dependent on the determined pad type.

In the present, second exemplary embodiment, the transmission of pressure in the pressure transmitter is performed using two pressure plates (also referred to as "Cv plates") 32 and 33 of different size, the pressure chambers of which can have the brake control pressure Cv applied to them via different inlets Cv1 and Cv2 of the pressure transmitter. A balance beam 34, which is controllable by a pneumatic cylinder 36, may be used to perform a load-dependent switchover as a function of the above-stated load value.

In the present exemplary embodiment, in the case of an emergency braking operation, firstly the inlet of the Cv1 chamber of the pressure transmitter 26 has the control pressure Cv applied thereto, which, owing to the relatively small pressure plate size, exerts a relatively low force and thus generates the relatively low brake pressure C. If, in the event of a brake pad change (for example from pad type B to pad type A in FIG. 2), an increased brake pressure C is required, this is achieved by applying the control pressure to the Cv2 chamber via the second inlet Cv2. The pressure plate of the Cv2 chamber has a larger area, and the differential force is added to the total force, which results in a higher brake pressure C and thus in a shift of the pressure characteristic curve in a vertical direction upward in FIG. 2.

In the second exemplary embodiment, the vertical shift of the brake pressure characteristic curve can thus be realized by aeration of an additional pilot-control volume 38 or of an additional piston area 39, or by connection to a second control chamber 40 by means of a manual switchover. Feedback to the brake controller (brake control unit) may be realized by means of position monitoring and reading-back of the status.

In the third exemplary embodiment, the switchover in the case of a new pad type may also be performed automatically by means of a solenoid valve 37 and actuation by the brake control unit, preferably by means of an impulse valve for maintaining the position in the electrically deenergized state.

In the fourth exemplary embodiment, an individual characteristic curve shift may also be realized by means of an analog variation of the brake control pressure in the second control chamber. This may be implemented by means of an electronic control loop. Here, a membrane or a pressure plate may be subjected to an analog pressure, which then influences the lower characteristic curve during the braking operation. Accordingly, it is for example possible for a fixed lower boundary of 2 bar to be provided, wherein, then, a straight or variable characteristic curve may be added as required.

In the fifth exemplary embodiment, it is also possible to realize a multiply stepped characteristic curve shift for adaptation to multiple pad types by stepped variation of the pressure in the second control chamber. This may be realized similarly to the fourth exemplary embodiment, wherein, here, the threshold is changed during the braking process in order, in addition to different pads, to also permit compensation of the behavior of the pad.

Figure 4:
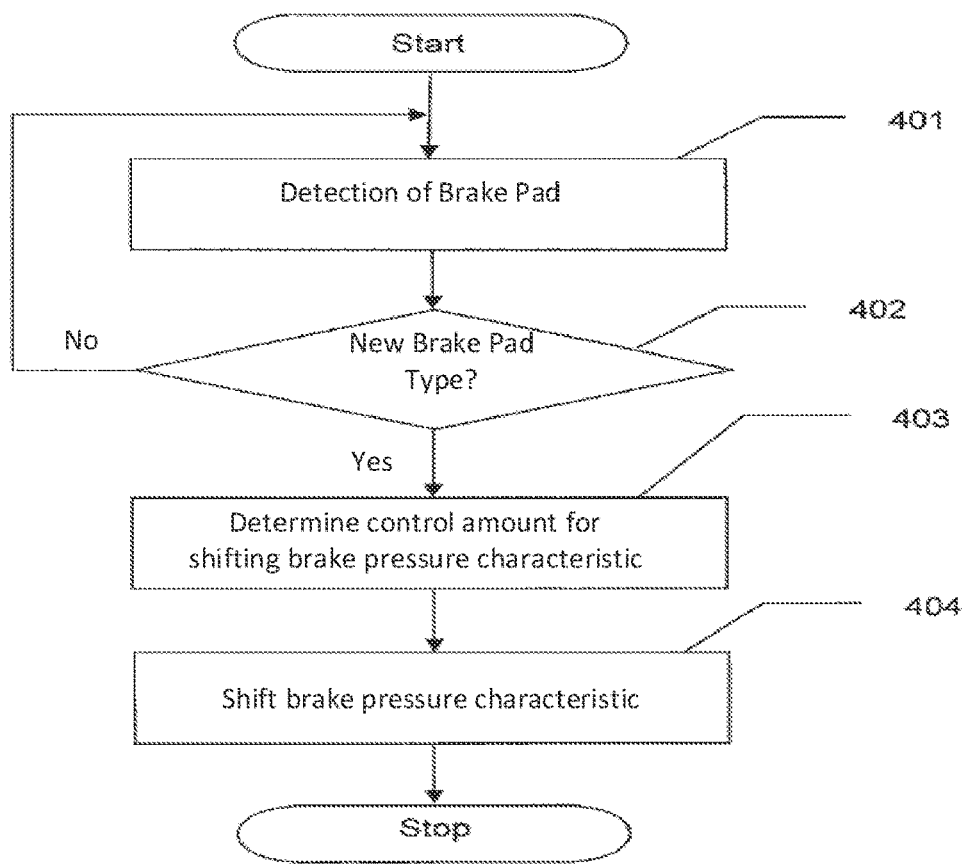
FIG. 4 shows a flow diagram of a control method according to a sixth exemplary embodiment.

FIG. 4 shows a flow diagram of a control method for a brake device with friction coefficient compensation according to a sixth exemplary embodiment, which may be implemented for example in a brake control device as software for computer control.

The program start is initiated for example upon or after a change of a brake pad. In the step 401, the detection of the brake pad type and of the friction coefficient associated therewith is firstly performed. This may be realized for example by means of manual input or scanning of an identification or identifier of the brake pad type or by other optical or transponder-based detection. Thereafter, in the step 402, by comparison with the most recently used brake pad type, it is checked whether a new brake pad type has been installed. If not, the steps 401 and 402 are repeated upon the next pad change. Alternatively, a jump to the end of the sequence may be performed. If, by contrast, it is detected in the step 402 that a new pad type has been installed, the sequence progresses to the step 403, and a control variable for the shift of the brake pressure characteristic curve is determined on the basis of the changed friction coefficient of the new brake pad type. The corresponding parameter values may be stored in a programmable or exchangeable memory table. The step 403 may also encompass the generation of the control signal BS that indicates the pad type. Finally, in the step 404, the shift of the brake pressure characteristic curve in accordance with the determined control variable is triggered by initiation of corresponding control measures, for example for the pressure transmitter. The sequence is thereafter ended.

It is pointed out that the proposed variation of the brake pressure characteristic curve does not imperatively have to be realized as a vertical shift. Depending on the friction characteristic of the new brake pad type, it is also possible for other changes with changed characteristic curve gradient or form to be realized through corresponding influencing of the pressure transmitter or of the supplied control pressure in order to realize a suitable friction coefficient compensation.

In summary, an apparatus and a method for controlling a brake device of a rail vehicle have been described, wherein, by means of a characteristic curve changing device, a pressure characteristic curve of the brake device is varied in a manner dependent on a friction characteristic of a brake pad type used in the brake device.

The features disclosed in the above description, in the drawings and in the claims may be essential to the realization of the invention both individually and in any desired combination.

The invention claimed is:

1. An apparatus for controlling a brake device of a rail vehicle, the apparatus comprising:
   a characteristic curve changing device for varying a pressure characteristic curve of the brake device dependent on a friction characteristic of a brake pad type used in the brake device, wherein the characteristic curve changing device effects a vertical shift of pressure-speed characteristic curve along the pressure axis dependent on the friction characteristic, and
   a determining device for determining the friction characteristic based on a control signal, which indicates the selected brake pad type
   wherein the friction characteristic of the brake pad type is an average friction coefficient.

2. The apparatus of claim 1, wherein the apparatus generates the control signal in response to a manual, electrical, electronic or electropneumatic switchover connected to the use of a new brake pad type.

3. The apparatus of claim 1, wherein the apparatus generates the control signal for the variation of the pressure characteristic curve both in a rapid braking operation and in a normal service braking operation.

4. The apparatus of claim 1, wherein the characteristic curve changing device effects the vertical shift of the pressure-speed characteristic curve in a pressure transmitter by aerating an additional pilot-control volume or by generating an additional piston area by connecting two control chambers.

5. The apparatus of claim 4, wherein the characteristic curve changing device performs the aeration of the additional pilot-control volume or the generation of the additional piston area by actuating a solenoid valve.

6. The apparatus of claim 5, wherein the solenoid valve is an impulse valve.

7. The apparatus of claim 1, wherein the characteristic curve changing device effects the vertical shift of the pressure-speed characteristic curve in a pressure transmitter by pressure variation in a second control chamber of two control chambers.

8. The apparatus of claim 7, wherein the characteristic curve changing device performs the pressure variation in multi-stage fashion.

9. A brake system for a rail vehicle, having an apparatus controlling a brake device of the rail vehicle, the apparatus comprising:
   a characteristic curve changing device for varying a pressure characteristic curve of the brake device dependent on a friction characteristic of a brake pad type used in the brake device, wherein the characteristic curve changing device effects a vertical shift of pressure-speed characteristic curve along the pressure axis dependent on the friction characteristic, and
   a determining device for determining the friction characteristic based on a control signal which indicates the selected brake pad type
   wherein the friction characteristic of the brake pad type is an average friction coefficient.

10. A method for controlling a brake device of a rail vehicle, the method comprising:
    varying a pressure characteristic curve of the brake device in a manner dependent on a friction characteristic of a brake pad type used in the brake device, wherein the varying is a vertical shift of pressure-speed characteristic curve along the pressure axis dependent on the friction characteristic, and determining the friction characteristic based on a control signal which indicates the brake pad type wherein the friction characteristic of the brake pad type is an average friction coefficient.

11. The method of claim 10, wherein the varying and determining are part of a braking process, wherein the braking process is a rapid braking operation.

12. A non-transitory computer program product having code means for controlling a brake device of the rail vehicle, when the computer program is executed in a computer system, the method comprising varying a pressure characteristic curve of the brake device in a manner dependent on a friction characteristic of a brake pad type used in the brake device, wherein the varying is a vertical shift of pressure-speed characteristic curve along the pressure axis dependent on the friction characteristic, and determining the friction characteristic based on a control signal which indicates the brake pad type, wherein the friction characteristic of the brake pad type is an average friction coefficient.

* * * * *